US012700585B2

(12) United States Patent (10) Patent No.: US 12,700,585 B2
Chen et al. (45) Date of Patent: Aug. 4, 2026

(54) BATTERY MATERIAL, ANODE, BATTERY AND MANUFACTURING METHOD OF BATTERY

(71) Applicant: LARGAN MEDICAL CO., LTD., Taichung City (TW)

(72) Inventors: Wei-Yuan Chen, Taichung City (TW); Po-Tsun Chen, Taichung City (TW); Tzu Lien Wang, Taichung City (TW); Shih Yu Huang, Taichung City (TW); Cheng-Yu Tsai, Taichung City (TW); Chun-Hung Teng, Taichung City (TW)

(73) Assignee: LARGAN MEDICAL CO., LTD., Taichung City (TW)

( * ) Notice: Subject to any disclaimer, the term of this patent is extended or adjusted under 35 U.S.C. 154(b) by 504 days.

(21) Appl. No.: 18/205,820

(22) Filed: Jun. 5, 2023

(65) Prior Publication Data

US 2023/0402587 A1 Dec. 14, 2023

Related U.S. Application Data

(60) Provisional application No. 63/350,136, filed on Jun. 8, 2022.

(51) Int. Cl.

| | |
|---|---|
| *H01M 4/36* | (2006.01) |
| *C08L 51/10* | (2006.01) |
| *H01M 4/02* | (2006.01) |
| *H01M 4/04* | (2006.01) |
| *H01M 4/133* | (2010.01) |
| *H01M 4/134* | (2010.01) |
| *H01M 4/38* | (2006.01) |
| *H01M 4/587* | (2010.01) |
| *H01M 10/058* | (2010.01) |

(52) U.S. Cl.
CPC ............. *H01M 4/366* (2013.01); *C08L 51/10* (2013.01); *H01M 4/0404* (2013.01); *H01M 4/133* (2013.01); *H01M 4/134* (2013.01); *H01M 4/386* (2013.01); *H01M 4/587* (2013.01); *H01M 10/058* (2013.01); *C08L 2203/20* (2013.01); *C08L 2207/53* (2013.01); *H01M 2004/021* (2013.01); *H01M 2004/027* (2013.01)

(58) Field of Classification Search
CPC .................................................. H01M 4/366
See application file for complete search history.

(56) References Cited

U.S. PATENT DOCUMENTS

| | | | |
|---|---|---|---|
| 2018/0282230 A1 | 10/2018 | Keunhwan et al. | |
| 2018/0375089 A1 | 12/2018 | Gosner et al. | |
| 2019/0181427 A1* | 6/2019 | Yang ..................... | H01M 4/386 |
| 2023/0238575 A1* | 7/2023 | Zhamu ................ | H01M 10/052 |
| | | | 429/322 |

FOREIGN PATENT DOCUMENTS

| | | | | |
|---|---|---|---|---|
| CN | 102792498 A | 11/2012 | | |
| CN | 108780890 A | 11/2018 | | |
| CN | 109314220 A | 2/2019 | | |
| CN | 109980274 A | 7/2019 | | |
| EP | 2924784 A1 * | 9/2015 | ........... | H01M 4/134 |
| JP | 2013004215 A | 1/2013 | | |
| JP | 2019503565 A | 2/2019 | | |
| JP | 2021068665 A | 4/2021 | | |
| KR | 101724012 B1 | 4/2017 | | |

OTHER PUBLICATIONS

Jian Shi, "A surface-engineering-assisted method to synthesize recycled silicon-based anodes with a uniform carbon shell-protective layer for lithium-ion batteries", Journal, 2021, 737-748, vol. 588, Journal of Colloid and Interface Science.
Aiping Zhu, "Synthesis of core shell PMMA-SiO2 nanoparticles with suspension-dispersion-polymerization in an aqueous system and its effect on mechanical properties of PVC composites", Journal, 2008, 540-547, vol. 27, Polymer Testing.
Shixin Song et al., "Enhanced properties of poly(vinylidene fluoride) with low filler content SiO2-g-(MMA-co-BA) core-shell nanoparticles", J Polym Res, published in May 24, 2016, vol. 23, issue 119, pp. 1-9, published by Springer, Germany.
Shixin Song et al., "Research of the Synthesis and Film Performance of Silica/Poly(St-BA-MPS) Core-Shell Latexes Obtained by Miniemulsion co-Polymerizaiton", Macromolecular Research, published in Jun. 2017, vol. 25, pp. 408-414, published by Springer, Germany.

* cited by examiner

*Primary Examiner* — Brian R Ohara
(74) *Attorney, Agent, or Firm* — Hayes Soloway P.C.

(57) ABSTRACT

A battery material is a core-shell structure, and the core-shell structure includes a core and a shell. The shell surrounds the core. A composition of the core is a silicon material. The shell includes a polymer, the polymer is linear, the polymer includes a first structure and a second structure, the first structure includes a siloxane group, and the second structure includes a carboxyl group or an ester group. The first structure is more adjacent to the core than the second structure.

29 Claims, No Drawings

BATTERY MATERIAL, ANODE, BATTERY AND MANUFACTURING METHOD OF BATTERY

RELATED APPLICATIONS

This application claims priority to U.S. Provisional Application Ser. No. 63/350,136, filed Jun. 8, 2022, which is herein incorporated by reference.

BACKGROUND

Technical Field

The present disclosure relates to a battery material, an anode, a battery and a manufacturing method of battery. More particularly, the present disclosure relates to a battery material, an anode, a battery and a manufacturing method of battery with high safety and long cycle life.

Description of Related Art

The current goals of research and development of batteries are to achieve the demands of high energy density, high working voltage, fast charging speed, and long cycle life. The commonly used materials for anodes are carbon or graphite nowadays, but the theoretical energy density of graphite is far lower than the requirement of kinetic energy of large electric devices, such as electric cars. Therefore, silicon material with high energy density is used as a new anode material, which has become a trend in the development of the lithium batteries in the future. However, it has been shown in the studies that when a battery, in which silicon anode materials are added, undergoes several charge-discharge cycles, the anode volume will extremely change and even crack because the lithium ions are repeatedly intercalated and moved out from the silicon carbon anode. The structural stability of the anode is seriously affected, resulting in loss of battery life.

SUMMARY

According to one aspect of the present disclosure, a battery material is a core-shell structure, and the core-shell structure includes a core and a shell. The shell surrounds the core. A composition of the core is a silicon material. The shell includes a polymer, the polymer is linear, the polymer includes a first structure and a second structure, the first structure includes a siloxane group, and the second structure includes a carboxyl group or an ester group. The first structure is more adjacent to the core than the second structure. When a diameter of the core is cD50, and a membrane thickness of the shell is Ths, the following condition is satisfied: $0<10\times(Ths/cD50)\leq8.0$.

According to one aspect of the present disclosure, an anode includes the battery material of the aforementioned aspect.

According to one aspect of the present disclosure, a battery includes the anode of the aforementioned aspect.

According to one aspect of the present disclosure, a battery material is a core-shell structure, and the core-shell structure includes a core and a shell. The shell surrounds the core. A composition of the core is a silicon material. The shell includes a polymer, the polymer is linear, the polymer includes a first structure and a second structure, the first structure includes a siloxane group, and the second structure includes a carboxyl group or an ester group. The first structure is more adjacent to the core than the second structure. When a diameter of the core is cD50, the following condition is satisfied: 30 nm<cD50.

According to one aspect of the present disclosure, an anode includes the battery material of the aforementioned aspect.

According to one aspect of the present disclosure, a battery includes the anode of the aforementioned aspect.

According to one aspect of the present disclosure, a manufacturing method of battery includes the steps as follows. A silicon material oxidizing step is performed, wherein an oxidant is added to make a surface of a silicon material be oxidized, and a solution with a siloxy compound is added for surface modification, so as to form an anode material precursor. An anode material preparing step is performed, wherein the anode material precursor is added to a solution with an alkenyl compound for polymerization, so as to form a first anode material. A coating step is performed, wherein an anode slurry is made of the first anode material, a carbon material, a first conductive agent, a first adhesive and a first organic solvent, the anode slurry is coated on at least one side of a metal current collector to form an anode piece, a cathode slurry is made of a cathode material, a second conductive agent, a second adhesive and a second organic solvent, and the cathode slurry is coated on at least one side of another metal current collector to form a cathode piece. An assembling step is performed, wherein the anode piece, the cathode piece and a separator are fixed in a battery assembly, an electrolyte is injected into the battery assembly, and the battery assembly is sealed. The siloxy compound includes a structure represented by formula (I):

$$(R)_3—Si—(CH_2)_n—X—(CH_2)_m-A \qquad \text{formula (I),}$$

wherein R is selected from a group consisting of methoxy group, ethoxy group and siloxy group, X is methyl group or oxygen, A is selected from a group consisting of ethenyl group, acrylate group and methacrylate group, and n and m satisfy the following condition: $0\leq n+m\leq10$. When a diameter of the silicon material is cD50, the following condition is satisfied: 30 nm<cD50<15000 nm.

DETAILED DESCRIPTION

According to one aspect of the present disclosure, a battery material is a core-shell structure, and the core-shell structure includes a core and a shell. The shell surrounds the core. A composition of the core is a silicon material. The shell includes a polymer, the polymer is linear, the polymer includes a first structure and a second structure, the first structure includes a siloxane group, and the second structure includes a carboxyl group or an ester group. The first structure is more adjacent to the core than the second structure.

According to the present disclosure, the polymer is applied to the anode material. A polymer protective layer is formed by covalent bonds around the peripheral surface layer of the silicon material. Due to the advantage that the polymer has elasticity and viscosity, it is adapted to the extremely volume change of the silicon material while charging and discharging, and the overall structural integrity can be maintained. Also, the problem of overall battery impedance increasing resulting from the silicon material directly touching the electrolyte and forming an interface layer can be prevented. Therefore, by the core-shell structure formed by the polymer and the silicon material, not only the overall capacity and energy density of the battery can be effectively enhanced, but the goal of maintaining the integrity of the anode structure can also be achieved. Thus, the safety and cycle life of the battery can be improved.

When a diameter of the core is cD50, and a membrane thickness of the shell is Ths, the following condition is satisfied: $0<10\times(Ths/cD50)\leq8.0$. Therefore, it is favorable for maintaining the overall structural integrity and the balance of ionic conductivity by adjusting the ratio of diameter of the core and the shell thickness. Moreover, the following conditions can be satisfied: $0<10\times(Ths/cD50)\leq7.0$; $0<10\times(Ths/cD50)\leq6.0$; $0<10\times(Ths/cD50)\leq4.0$; $0<10\times(Ths/cD50)\leq2.0$; $0<10\times(Ths/cD50)\leq1.5$; or $0.01\leq10\times(Ths/cD50)\leq1.25$.

A precursor of the first structure can be 3-trimethoxysilylpropyl 2-methylprop-2-enoate, and the composition of the core can include silicon and silicon oxide. Therefore, it is favorable for strengthening the protective ability of the polymer because the first structure has the stable siloxane structure, which is formed by the condensation of siloxy structure and silicon oxide.

A precursor of the second structure can be selected from a group consisting of methyl 2-methylprop-2-enoate, 2-ethylhexyl prop-2-enoate, methyl prop-2-enoate and prop-2-enoic acid. Therefore, it is favorable for maintaining the integrity of the core-shell structure because the precursor monomer of the second structure includes unsaturated functional groups, and the polymer is formed by the addition polymerization and copolymerization of the multiple monomers.

The precursor of the second structure can be selected from at least two materials of the group consisting of methyl 2-methylprop-2-enoate, 2-ethylhexyl prop-2-enoate, methyl prop-2-enoate and prop-2-enoic acid. Therefore, it is favorable for enhancing the stability of the polymer structure by selecting various monomers, which can be copolymerized with each other, to form the polymer.

When the diameter of the core is cD50, the following condition can be satisfied: $350 \text{ nm}<cD50<15000 \text{ nm}$. Therefore, it is favorable for reducing the aggregation of the core-shell structure and the cost by selecting the silicon material with relatively large diameter as the composition of the core. Furthermore, the following conditions can be satisfied: $500 \text{ nm}\leq cD50\leq50000 \text{ nm}$; $600 \text{ nm}\leq cD50\leq30000$ nm; $800 \text{ nm}\leq cD50\leq10000 \text{ nm}$; $1000 \text{ nm}\leq cD50\leq8000 \text{ nm}$; $1200 \text{ nm} \leq cD50\leq7000$ nm; $1400 \text{ nm}\leq cD50\leq6000 \text{ nm}$; or $1600 \text{ nm}\leq cD50\leq4000 \text{ nm}$. Moreover, the following condition can be satisfied: $30 \text{ nm}<cD50<150 \text{ nm}$. Therefore, it is favorable for reducing the stress as the silicon material expanding by selecting the silicon material with relatively small diameter as the composition of the core. Moreover, the following conditions can be satisfied: $50 \text{ nm}\leq cD50\leq120 \text{ nm}$; or $60 \text{ nm}\leq cD50\leq100 \text{ nm}$.

When the membrane thickness of the shell is Ths, the following condition can be satisfied: $10 \text{ nm}<Ths<150 \text{ nm}$. Therefore, it is favorable for forming a buffer layer, which is adapted to the extremely volume change of the silicon material while charging and discharging, by wrapping a relatively thick membrane around the silicon material with relatively large diameter. Furthermore, the following conditions can be satisfied: $1 \text{ nm}\leq Ths\leq120 \text{ nm}$; $2 \text{ nm}\leq Ths\leq80 \text{ nm}$; $3 \text{ nm}\leq Ths\leq50 \text{ nm}$; $4 \text{ nm}\leq Ths\leq35 \text{ nm}$; $5 \text{ nm}\leq Ths\leq20 \text{ nm}$; $5 \text{ nm}\leq Ths\leq10 \text{ nm}$; or $15 \text{ nm}\leq Ths\leq20 \text{ nm}$. Moreover, the following condition can be satisfied: $1 \text{ nm}<Ths<50 \text{ nm}$. Therefore, it is favorable for forming a buffer layer and maintaining high ionic conductivity by wrapping a membrane with proper thickness around the silicon material with relatively small diameter.

According to another aspect of the present disclosure, a battery material is a core-shell structure, and the core-shell structure includes a core and a shell. The shell surrounds the core. A composition of the core is a silicon material. The shell includes a polymer, the polymer is linear, the polymer includes a first structure and a second structure, the first structure includes a siloxane group, and the second structure includes a carboxyl group or an ester group. The first structure is more adjacent to the core than the second structure. When a diameter of the core is cD50, the following condition is satisfied: $30 \text{ nm}<cD50$. Therefore, it is favorable for being adapted to the extremely volume change of the silicon material and maintaining the integrity of the core-shell structure by selecting the silicon material with proper diameter, and by wrapping the polymer around the silicon material to form the core-shell structure with siloxane structure bonding through condensation reaction.

When the diameter of the core is cD50, the following condition can be satisfied: $40 \text{ nm}<cD50<15000 \text{ nm}$. Therefore, it is favorable for enhancing the energy density of the battery by selecting the silicon material with proper diameter as the composition of the anode.

The composition of the core can include silicon and silicon oxide. Therefore, it is favorable for strengthening the protective ability of the polymer because the composition of the core has the stable siloxane structure, which is formed by silicon oxide and the polymer.

According to one another aspect of the present disclosure, an anode includes the battery material of any one of the aforementioned aspects. The anode can further include a carbon material. Therefore, it is favorable for improving the battery life by adding the carbon material in the anode.

When a total weight of the core-shell structure is Wk, and a total weight of the carbon material is Wt, the following condition can be satisfied: $0.01<(Wk/Wt)<10.0$. Therefore, it is favorable for improving the capacity of the battery by adjusting the weight ratio of the core-shell structure and the carbon material in the anode. Moreover, the following conditions can be satisfied: $0.01\leq(Wk/Wt)$ s 8.0; $0.01\leq(Wk/Wt)\leq6.0$; $0.01\leq(Wk/Wt)\leq4.0$; $0.01\leq(Wk/Wt)\leq2.0$; or $0.01\leq(Wk/Wt)\leq1.0$.

When a diameter of the carbon material at 10% of diameter cumulative distribution is gD10, a diameter of the carbon material at 50% of diameter cumulative distribution is gD50, and a diameter of the carbon material at 90% of diameter cumulative distribution is gD90, the following condition can be satisfied: $0<(gD90-gD10)/gD50<5.0$. Therefore, it is favorable for enhancing Coulombic efficiency of the battery by using the carbon material with relatively concentrated diameter distribution as the composition of the anode. Moreover, the following conditions can be satisfied: $0.2\leq(gD90-gD10)/gD50\leq4.0$; $0.4\leq(gD90-gD10)/gD50\leq3.0$; $0.6\leq(gD90-gD10)/gD50\leq2.5$; $0.8\leq(gD90-gD10)/gD50\leq2.0$; or $1.0\leq(gD90-gD10)/gD50\leq1.7$.

The anode includes a coating layer. When a thickness of the coating layer is ThA, the following condition can be satisfied: $50 \text{ }\mu m<ThA<350 \text{ }\mu m$. Therefore, it is favorable for controlling the cost and enhancing the feasibility of mass production of the electrode pieces by controlling the thickness of the coating layer on the anode. Moreover, the following conditions can be satisfied: $60 \text{ }\mu m\leq ThA\leq300 \text{ }\mu m$; $70 \text{ }\mu m\leq ThA\leq250 \text{ }\mu m$; $80 \text{ }\mu m\leq ThA\leq200 \text{ }\mu m$; $85 \text{ }\mu m\leq ThA\leq180 \text{ }\mu m$; or $90 \text{ }\mu m\leq ThA\leq150 \text{ }\mu m$.

When a surface roughness of the coating layer of the anode is Ra, the following condition can be satisfied: $1.0 \text{ }\mu m<Ra<10.0 \text{ }\mu m$. Therefore, the poor contact at the interface of the anode surface and the electrolyte can be prevented by maintaining the flatness of the surface of the coating layer on the anode, which can effectively enhance the ionic conduction and stability. Moreover, the following conditions can be satisfied: 1.2 $\mu m \leq Ra \leq 8.0$ $\mu m$; 1.4 $\mu m \leq Ra \leq 7.0$ $\mu m$; 1.6 $\mu m \leq Ra \leq 6.0$ $\mu m$; 1.8 $\mu m \leq Ra \leq 5.0$ $\mu m$; or 2.0 $\mu m \leq Ra \leq 4.5$ $\mu m$.

According to still another aspect of the present disclosure, a battery includes the anode of the aforementioned aspect.

When a discharge volumetric capacity of a first cycle of the battery is $vC1$, the following condition can be satisfied: 30 mAh/cm³$\leq vC1 \leq$200 mAh/cm³. Therefore, a high standard can be obtained by testing the capacity of the first cycle of the battery, and it is favorable for obtaining an important index for measuring the capacity and performance of the battery. Moreover, the following conditions can be satisfied: 35 mAh/cm³$\leq vC1 \leq$180 mAh/cm³; 40 mAh/cm³$\leq vC1 \leq$170 mAh/cm³; 45 mAh/cm³$\leq vC1 \leq$160 mAh/cm³; 50 mAh/cm³$\leq vC1 \leq$150 mAh/cm³; or 52 mAh/cm³$\leq vC1 \leq$140 mAh/cm³.

When a maximum of discharge volumetric capacities from the first cycle of the battery to a tenth cycle of the battery is $vCMax$, the following condition can be satisfied: 30 mAh/cm³$\leq vCMax \leq$200 mAh/cm³. Therefore, it is favorable for observing the capacity of the battery after the battery reaches a stable condition by measuring the maximum capacity in first ten cycles. Moreover, the following conditions can be satisfied: 35 mAh/cm³$\leq vCMax \leq$180 mAh/cm³; 40 mAh/cm³$\leq vCMax \leq$170 mAh/cm³; 45 mAh/cm³$\leq vCMax \leq$160 mAh/cm³; 50 mAh/cm³$\leq vCMax \leq$150 mAh/cm³; or 52 mAh/cm³$\leq vCMax \leq$140 mAh/cm³.

When a discharge volumetric capacity of a fifth cycle of the battery is $vC5$, and a discharge volumetric capacity of the tenth cycle of the battery is $vC10$, the following condition can be satisfied: 0.80$\leq vC10/vC5$. Therefore, it is favorable for obtaining a basis for determining the battery life by comparing the difference between the capacity of the battery after five cycles and after ten cycles. Moreover, the following conditions can be satisfied: 0.82$\leq vC10/vC5 \leq$1.20; 0.84$\leq vC10/vC5 \leq$1.18; 0.86$\leq vC10/vC5 \leq$1.15; 0.88$\leq vC10/vC5 \leq$1.10; or 0.90$\leq vC10/vC5 \leq$1.05.

When a total number of Coulombic efficiency greater than 85% in the first ten cycles of the battery is $nCE10$, the following condition can be satisfied: 7$\leq nCE10$. Therefore, it can be a quantitative index of reversibility of the battery if all of the Coulombic efficiencies meet the high standard in multiple cycles. Moreover, the following conditions can be satisfied: 8$\leq nCE10$; 9$\leq nCE10$; or 10$\leq nCE10$.

When an internal resistance of the fifth cycle of the battery is $R5$, and an internal resistance of the tenth cycle of the battery is $R10$, the following condition can be satisfied: 0.50$\leq R5/R10$. Therefore, it is favorable for maintaining the stability in the subsequent cycles by comparing the difference of the internal resistances of the battery after five cycles and after ten cycles. Moreover, the following conditions can be satisfied: 0.60$\leq R5/R10 \leq$1.0; 0.70$\leq R5/R10 \leq$1.0; 0.75$\leq R5/R10 \leq$1.0; 0.80$\leq R5/R10 \leq$1.0; or 0.85$\leq R5/R10 \leq$0.98.

According to yet another aspect of the present disclosure, a manufacturing method of battery includes the steps as follows: a silicon material oxidizing step is performed; an anode material preparing step is performed; a coating step is performed; and an assembling step is performed.

In the silicon material oxidizing step, an oxidant is added to make a surface of a silicon material be oxidized, and a solution with a siloxy compound is added for surface modification, so as to form an anode material precursor.

In the anode material preparing step, the anode material precursor is added to a solution with an alkenyl compound for polymerization, so as to form a first anode material.

In the coating step, an anode slurry is made of the first anode material, a carbon material, a first conductive agent, a first adhesive and a first organic solvent, the anode slurry is coated on at least one side of a metal current collector to form an anode piece. Further, a cathode slurry is made of a cathode material, a second conductive agent, a second adhesive and a second organic solvent, and the cathode slurry is coated on at least one side of another metal current collector to form a cathode piece.

In the assembling step, the anode piece, the cathode piece and a separator are fixed in a battery assembly, an electrolyte is injected into the battery assembly, and the battery assembly is sealed.

The siloxy compound in the silicon material oxidizing step includes a structure represented by formula (I):

$$(R)_3\text{—Si—}(CH_2)_n\text{—X—}(CH_2)_m\text{-A} \qquad \text{formula (I )},$$

wherein R is selected from a group consisting of methoxy group, ethoxy group and siloxy group, X is methyl group or oxygen, A is selected from a group consisting of ethenyl group, acrylate group and methacrylate group, and n and m satisfy the following condition: 0$\leq n+m \leq$10.

When the diameter of the silicon material is $cD50$, the following condition is satisfied: 30 nm$<cD50<$15000 nm.

Therefore, it is favorable for improving the grafting ratio of the polymer by forming an oxidizing layer on the surface of the silicon material by the oxidant. The core-shell structure, which has the core of silicon material and the shell of polymer, is manufactured by performing the surface modification by the siloxy compound, and performing the polymerization with the compound having the alkenyl group. By taking the polymer as a buffering protective layer, the goal of maintaining the integrity of the anode structure is achieved. Thus, the safety and cycle life of the battery can be improved.

According to the present disclosure, the precursor of the first structure can include at least one of alkenyl group (—C=C—), carbonyl group (—C=O), carboxyl group (—COOH), amide group (—CONH₂) or siloxy of silyl enol ether, which includes: ethenyl(trimethoxy)silane, ethenyl (triethoxy)silane, ethenyl-dimethoxy-methylsilane, 2-(chloromethyl)prop-2-enyl-trimethoxysilane, [2-hydroxy-3-[3-[methyl-bis(trimethylsilyloxy)silyl]propoxy]propyl] 2-methylprop- 2-enoate, 3-[dimethyl(trimethylsilyloxy)silyl]propyl 2-methylprop-2-enoate, 3-[methyl-bis(trimethylsilyloxy)silyl]propyl 2-methylprop-2-enoate, N-prop-2-enyl-3-trimethoxysilylpropan-1-amine, (3-isocyanatopropyl)-triethoxysilane, 1-[3-(trimethoxysilyl) propyl]urea, and vinylmethylsiloxane-dimethylsiloxane silanol terminated copolymer. The siloxy compound can further be but not limited to the following structure:

$$(R)_3\text{—Si—}(CH_2)_n\text{—X—}(CH_2)_m\text{-A},$$

wherein R is selected from a group consisting of methoxy group, ethoxy group and siloxy group, X is methyl group or oxygen, A is selected from a group consisting of ethenyl group, acrylate group and methacrylate group, and n and m satisfy the following condition: 0$\leq n+m \leq$10. The siloxy compound can include: triethoxysilylmethyl 2-methylprop-2-enoate, 2-trimethylsilyloxyethyl 2-methylprop-2-enoate, 3-trimethoxysilylpropyl 2-methylprop-2-enoate (MPS), 4-trimethoxysilylbutyl 2-methylprop-2-enoate, 5-trimethoxysilylpentyl 2-methylprop-2-enoate, 6-trimethoxysilylhexyl 2-methylprop-2-enoate, 7-trimethoxysilylheptyl 2-methylprop-2-enoate, 8-trimethoxysilyloctyl 2-methylprop-2-enoate, 9-trimethoxysilylnonyl 2-methylprop-2-enoate, 10-trimethoxysilyldecyl 2-methylprop-2-enoate, tris(trimethylsilyloxy)silylmethyl 2-methylprop-2-enoate, and 3-tris (trimethylsilyloxy)silylpropyl 2-methylprop-2-enoate.

According to the present disclosure, the Si—H bond on the surface of the silicon material can be oxidized into silanol group (Si—OH), or the silicon can be oxidized into silicon dioxide by the oxidant, which is favorable for forming the oxidizing layer at the surface of the silicon material.

According to the present disclosure, silanol group (Si—OH) with activity can be formed by the hydrolysis reaction of the siloxy compound and perform a condensation reaction with the silicon material, especially forming the silicon oxidizing layer on the surface by the oxidant. Thus, the siloxane with the structure of Si—O—Si can be formed.

According to the present disclosure, in the core-shell structure, the shell includes the first structure and the second structure. The polymer can be formed by the covalent bonding of the addition polymerization and copolymerization of the precursor of the first structure, which has unsaturated alkenyl group or acrylate group, and the precursor of the second structure, which has unsaturated alkenyl group or acrylate group.

According to the present disclosure, the membrane thickness of the shell can be changed by adjusting the type of the monomer, the polymerization concentration of the monomer or the polymerization time of the monomer of the precursor of the second structure.

According to the present disclosure, the core-shell structure can include a crosslinking agent, which helps the linear polymers crosslinks and bonds with each other to form a network structure. The crosslinking agent can be any terminally ethylenically unsaturated compound, which can include: 2-(2-methylprop-2-enoyloxy)ethyl 2-methylprop-2-enoate, 2-[2-(2-methylprop-2-enoyloxy)ethoxy]ethyl 2-methylprop-2-enoate, 2-[2-[2-(2-methylprop-2-enoyloxy) ethoxy]ethoxy]ethyl 2-methylprop-2-enoate, 2-[2-[2-[2-(2-methylprop-2-enoyloxy)ethoxy]ethoxy]ethoxy]ethyl 2-methylprop-2-enoate, prop-2-enyl 2-methylprop-2-enoate, 3-(2-methylprop-2-enoyloxy)propyl 2-methylprop-2-enoate, [2-methyl-3-(2-methylprop-2-enoyloxy)propyl] 2-methylprop-2-enoate, 4-(2-methylprop-2-enoyloxy)butyl 2-methylprop-2-enoate, and 6-(2-methylprop-2-enoyloxy) hexyl 2-methylprop-2-enoate.

According to the present disclosure, the cathode material can include lithium or a lithium composite metal oxide with at least one metal, such as $LiFePO_4$, $LiMnO_2$, $LiMn_2O_4$, $LiCoO_2$, $LiNiO_2$, $LiNiCoO_2$, $LiNiMnO_4$, $LiCoMnO_2$, $LiCoMnO_4$, $LiNiCoMnO_2$, $LiNiCoMnO_4$, or the combination thereof. The aforementioned lithium composite metal oxide can have various oxidation states.

According to the present disclosure, the anode material can be metal lithium, carbon material (graphite), silicon material, lithium metal oxide ($Li_4Ti_5O_{12}$), or the combination thereof. The silicon material can be silicon, silicon oxide, silicon-carbon composite, silicon alloy or core-shell composite made from silicon particles and polymer.

According to the present disclosure, the silicon-carbon composite can include a core-shell structure of silicon surrounded by carbon shell, a silicon-carbon yolk-shell structure and a porous structure. The core-shell structure of silicon surrounded by carbon shell is to cover a layer of carbon shell around the silicon material by pyrolysis in the absence of oxygen. The silicon-carbon yolk-shell structure is to generate silicon oxide on the surface of silicon, and cover a layer of carbon shell around the silicon material by pyrolysis in the absence of oxygen. Then, silicon oxide is removed by hydrofluoric acid (HF) to make silicon particles break into tiny nano-particles. The porous structure is manufactured by the materials with low self-diffusion coefficients or adding foaming materials and through sintering or electrochemical corrosion, so as to carbonize the intermediate product to form a silicon carbide ceramic porous material.

According to the present disclosure, the electrolyte can be combinations of metal salts, additives and organic solvents. The composition ratio of the organic solvents can be larger than the composition ratio of the additives. The condition of the electrolyte can be liquid, gel or solid. The additives and the organic solvents of the electrolyte can be physically mixed, or at least one of the following additives and the organic solvent monomers can be selected as a precursor for polymerization.

According to the present disclosure, the metal salts can include lithium inorganic acid salts, such as $LiPF_6$, $LiBF_4$, $LiSbF_6$, $LiAsF_6$, $LiClO_4$, $LiC_4BO_8$, LiTFSI, LiFSI, $LiNO_3$ or $LiGaCl_4$, lithium sulfonate salts with fluorine, such as $LiCF_3SO_3$, $LiN(C_2F_5SO_2)_2$, $LiN(CF_3SO_2)_2$ or $LiC(CF_3SO_2)_3$, $LiBF_2(C_2O_4)$ (LiDFOB), $LiB(C_2O_4)_2$ (LiBOB), or the combination thereof. The aforementioned metal oxide can have various oxidation states.

According to the present disclosure, the organic solvents can be carbonate esters, carboxylate esters, ethers, sulfides, or the combination thereof. The aforementioned organic solvents can also be used as the additives.

According to the present disclosure, the structure of the organic solvents can include polymerizable olefin groups, which can be the monomers of the precursor of the second structure. For example, it can be 2H-1,3-dioxol-2-one (vinylene carbonate; VC), 4-vinyl-1,3-dioxolan-2-one (vinylethylene carbonate; VEC), 1,3-dithiole-2-thione (vinylene trithiocarbonate), 2,5-dihydrothiophene-1,1-dioxide, 1-ethenylsulfonylethene, prop-1-ene-1,3-sultone, cyclic additives with ether groups or additives of aromatic compounds.

According to the present disclosure, the organic solvents of the carbonate esters can be a compound in which the hydrogen atoms of the hydroxyl group in the carbonic acid are partially or wholly substituted by alkyl groups. It can be divided into the cyclic carbonate esters and the linear carbonate esters. The linear carbonate esters can include: dimethyl carbonate (DMC), diethyl carbonate (DEC), dipropyl carbonate (DPC), ethyl methyl carbonate (EMC), methyl propyl carbonate (MPC), ethyl propyl carbonate (EPC), methyl 2,2,2-trifluoroethyl carbonate (FEMC). The cyclic carbonate esters can include: 1,3-dioxolan-2-one (ethylene carbonate; EC), 4-methyl-1,3-dioxolan-2-one (propylene carbonate; PC), 1,3-dioxan-2-one (trimethylene carbonate; TMC), 4-ethyl-1,3-dioxolan-2-one (1,2-butylene carbonate), (4R,5S)-4,5-dimethyl-1,3-dioxolan-2-one (cis-2,3-butylene carbonate), 1,2-pentylene carbonate, 2,3-pentylene carbonate, 2H-1,3-dioxol-2-one (vinylene carbonate; VC), 4-vinyl-1,3-dioxolan-2-one (vinylethylene carbonate; VEC), 4-fluoro-1,3-dioxolan-2-one (fluoroethylene carbonate; FEC), trans-4,5-difluoro-1,3-dioxolan-2-one (difluoroethylene carbonate; DFEC), 1,3-dithiole-2-thione (vinylene trithiocarbonate), or the combination thereof.

According to the present disclosure, the organic solvents of the carboxylate esters can be manufactured by the esterification of alcohols and carboxyl acids. It can be methyl acetate, ethyl acetate, propyl acetate, methyl propionate, ethyl propionate, propyl propionate, methyl butyrate, ethyl butyrate, lactone, or the combination thereof. The lactone can further include 1-oxacycloalkan-2-one structure, which means a compound having hydroxyl groups and carboxyl acids, and the monomers of cyclic carboxylate esters are formed by the intramolecular condensation. There can be various combinations according to the positions of the hydroxyl groups for forming a ring and the number of carbon atoms in the ring, which can include: oxiran-2-one (α-acetolactone), oxetan-2-one (β-propiolactone), oxolan-2-one (γ-butyrolactone), 5-methyloxolan-2-one (γ-valerolactone), oxan-2-on (σ-valerolactone), 5-ethyloxolan-2-one (γ-caprolactone), oxepan-2-one (ε-caprolactone), D-glucono-1,5-lactone (δ-gluconolactone), or the combination thereof.

According to the present disclosure, the organic solvents of the ethers can be oxolane (THF), 2-methyloxolane (2-MeTHF), 1,3-dioxolane (DOL), 4-methyl-1,3-dioxolane (4-MeDOL), dimethoxymethane (DMM), 1,2-dimethoxyethane (DME), 2,2-dimethoxypropane (DMP), 1,2-bis(2-cyanoethoxy)ethane (DENE), 1-methoxy-2-(2-methoxyethoxy)ethane (DG), or the combination thereof.

According to the present disclosure, the organic solvents of the sulfides can be compounds with sulfone group (—(O═)S(═O)—) or compounds with sulfonate group (—SO$_2$O$^-$). The compounds with sulfone group can include: 2,5-dihydrothiophene-1,1-dioxide, 1-ethenylsulfonylethene. The compounds with sulfonate group can be divided into mesylate (CH$_3$SO$_2$O$^-$), trifluoromethanesulfonate (CF$_3$SO$_2$O$^-$), p-toluenesulfonyl group (Tosyl), which can include 1-methylsulfonyloxyethane, methyl 4-methylbenzenesulfonate, oxathiolane 2,2-dione, prop-1-ene-1,3-sultone, 1,3,2-dioxathiane 2,2-dioxide, or the combination thereof.

According to the present disclosure, the additives can be carbonate ester compounds, lactone cyclic esters, cyclic compounds with ether groups, aromatic compounds, phosphorus compounds, boron compounds, inorganic oxides, or the combination thereof. It is favorable for improving the efficacy of the battery by adding proper amount of additives. For example, the SEI membrane composition is improved, the efficacy under high temperature and high voltage is enhanced, the ion transportation ability is enhanced, the impedance of the electrolyte is reduced, the stability of cycles is improved, the integrity of the cathode and anode materials is maintained, and the electrochemical stability is enhanced.

According to the present disclosure, the lactone cyclic ester can be two compounds, which are the same as or different from each other, both include hydroxy acid, and form polycyclic diester monomers by esterification condensation. It can include: 1,4-dioxane-2,5-dione (glycolide), 3,6-dimethyl-1,4-dioxane-2,5-dione (lactide), or the combination thereof. According to the stereoisomerisms formed from different orientations of the atoms in the space, the 3,6-dimethyl-1,4-dioxane-2,5-dione can be further divided into (R,R)-3,6-dimethyl-1,4-dioxane-2,5-dione (LL-lactide), (S,S)-3,6-dimethyl-1,4-dioxane-2,5-dione (DD-lactide), (meso)-3,6-dimethyl-1,4-dioxane-2,5-dione (DL-lactide). Moreover, it can be a carboxylic acid compound with hydroxyl group, which can directly form the polymer by copolymerization without ring-opening reaction. It can include: 2-hydroxyacetic acid (glycolic acid), 3-hydroxypropanoic acid (lactic acid), 4-hydroxybutanoic acid, 5-hydroxyvaleric acid, or the combination thereof.

According to the present disclosure, the additives of the cyclic compounds with ether groups can be crown ether. The crown ether has vinyloxy groups (—CH$_2$CH$_2$O—) as the main repeating unit, which can include: 1,4,7-trioxonane (9-crown-3), 1,4,7,10-tetraoxacyclododecane (12-crown-4), 1,4,7,10,13-pentaoxacyclopentadecane (15-crown-5), 1,4,7,10,13,16-hexaoxacyclooctadecane (18-crown-6), 1,4,7,10,13,16,19-heptaoxacyclohenicosane (21-crown-7), 6,7,9,10,17,18,20,21-octahydrodibenzo[b,k][1,4,7,10,13,16]

hexaoxacyclooctadecine (dibenzo-18-crown-6), 1,4,10,13-tetraoxa-7,16-diazacyclooctadecane (diaza-18-crown-6), or the combination thereof.

According to the present disclosure, the additives of the aromatic compounds can include methoxybenzene, 1-ethynyl-4-methoxybenzene, tert-butylbenzene, fluorobenzene, 1,2-difluorobenzene, 1,1'-oxydibenzene, 1,4-diphenylbenzene, 2-fluoro-4-(2-methyl-2-propanyl)aniline, N-[3-(trimethoxysilyl)propyl]aniline, or the combination thereof.

According to the present disclosure, the additives of the phosphorus compounds can be tris(trimethylsilyl) phosphite (TMSPi), tris(2,2,2-trifluoroethyl) phosphite, triphenyl phosphite, 1,3,5,2,4,6-triazatriphosphorine, 2-ethoxy-2,4,4,6,6-pentafluoro-2,2,4,4,6,6-hexahydro-, or the combination thereof.

According to the present disclosure, the additives of the boron compounds can be trimethyl borate, tris(trimethylsilyl) borate, 2,4,6-trimethyl-1,3,5,2,4,6-trioxatriborinane, or the combination thereof.

According to the present disclosure, the additives of the inorganic oxides can be composite materials such as LiLaZrO, LiLaZrTaO, LiLaTiO, LiPO, LiPOF, LiTiPO, LiAlGeP, LiAlTiPO, LiGePSO, LiSnPSO, PbZrTiO, PbLaZrTiO, or BaTiO. The aforementioned additives of the inorganic oxides can have various oxidation states, or can be Al$_2$O$_3$, TiO$_2$, SiO$_2$, SnO$_2$, NiO, ZnO, CaO, MgO, ZrO$_2$, CeO$_2$, Y$_2$O$_3$, etc. The crystallinity of the polymer electrolyte can be reduced, and the ion conductivity and the physical mechanical strength of the electrolyte can be enhanced, which is favorable for increasing the cycle life of the battery.

According to the present disclosure, the separator can be a thin film with porous structure, and can include a single layer or multiple layers of fibers of polyolefins, polyamides, polyesters, such as polyethylene (PE), polypropylene (PP), polyethylene terephthalate (PET), acrylonitrile butadiene styrene copolymer (ABS), epoxy resin. The surface thereof can include an inorganic ceramic composite film of at least one of Mg(OH)$_2$, MgO, BaSO$_4$, SnO$_2$, NiO, CaO, Al$_2$O$_3$, ZnO, SiO$_2$, TiO$_2$, or the combination thereof. The aforementioned inorganic ceramic composite film can have various oxidation states.

According to the present disclosure, the adhesive can be poly(1,1-difluoroethylene) (PVDF), styrene-butadiene rubber (SBR), poly(methylene) (PE), poly(ethenol) (PVA), poly(1-ethenylpyrrolidin-2-one) (PVP), poly(1-methylethylene) (PP), poly(1-acrylonitrile) (PAN), carboxymethyl cellulose (CMC), poly(1,1,2,2-tetrafluoroethylene) (PTFE), ethylene propylene diene monomer (EPDM), hypalon polyethlene rubber (CSM) or alginic acid made of mono alduronic acid by linear polymerization.

According to the present disclosure, the conductive agent can be graphite, KS6, SFG6, graphene, acetylene black, ketjenblack, carbon black, super P, carbon nanotube (CNT), aluminium, nickel, titanium dioxide, potassium hexatitanate (PHT), or the combination thereof.

According to the present disclosure, in the core-shell structure, when a weight of the core is Wc, and a weight of the shell is Ws, the following condition can be satisfied: Wc>Ws.

According to the present disclosure, in the core-shell structure, the core at least includes silicon and silicon oxide. When a weight of silicon is Wci, and a weight of silicon oxide is Wco, the following condition can be satisfied: 0<Wco/Wci<1. Moreover, the following conditions can be satisfied: 0<Wco/Wci<0.5; 0<Wco/Wci<0.3; 0<Wco/Wci<0.1; or 0.01<Wco/Wci<0.1.

According to the present disclosure, the cycles of the battery are defined as the battery is in a condition of a commercial product, and the first test under the aforementioned condition is taken as the first cycle of the present disclosure. One complete discharging and charging test is taken as one cycle, and the number of the cycles is accumulated accordingly.

According to the present disclosure, the volumetric capacity vC (mAh/cm$^3$) means the capacity provided by the anode material per cubic centimeter in a battery, and the anode material does not include the current collector. The current collector is a substrate formed by a metal foil, such as aluminum foil or copper foil.

According to the present disclosure, when the discharge volumetric capacity of the fifth cycle of the battery is vC5, and a discharge volumetric capacity of a hundredth cycle of the battery is vC100, the following condition can be satisfied: 0.70≤vC100/vC5. Moreover, the following conditions can be satisfied: 0.75≤vC100/vC5; 0.80≤vC100/vC5; or 0.85≤vC100/vC5.

According to the present disclosure, when the discharge volumetric capacity of the fifth cycle of the battery is vC5, and a discharge volumetric capacity of a five-hundredth cycle of the battery is vC500, the following condition can be satisfied: 0.70≤vC500/vC5. Moreover, the following conditions can be satisfied: 0.75≤vC500/vC5; 0.80≤vC500/vC5; or 0.85≤vC500/vC5.

According to the present disclosure, when a total number of Coulombic efficiency greater than 85% in first one hundred cycles of the battery is nCE100, the following condition can be satisfied: 70≤nCE100. Moreover, the following conditions can be satisfied: 75≤nCE100; 80≤nCE100; or 85≤nCE100.

According to the present disclosure, when a total number of Coulombic efficiency greater than 85% in first five hundred cycles of the battery is nCE500, the following condition can be satisfied: 400≤nCE500. Moreover, the following conditions can be satisfied: 420≤nCE500; 450≤nCE500; 470≤nCE500; or 485≤nCE500.

According to the present disclosure, the volumetric energy density can be calculated according to the following equation:

Volumetric energy density (Wh/L)=discharge capacity (Ah)×nominal voltage (V)/total volume of battery (L).

According to the present disclosure, the gravimetric energy density can be calculated according to the following equation:

Gravimetric energy density (Wh/kg)=discharge capacity (Ah)×nominal voltage (V)/total weight of battery (kg).

According to the present disclosure, when a discharge volumetric energy density of the fifth cycle of the battery is vE5, the following condition can be satisfied: 500 Wh/L≤vE5≤900 Wh/L. Moreover, the following conditions can be satisfied: 550 Wh/L≤vE5≤850 Wh/L; or 600 Wh/L≤vE5≤800 Wh/L.

According to the present disclosure, when a discharge gravimetric energy density of the fifth cycle of the battery is gE5, the following condition can be satisfied: 180 Wh/kg≤gE5≤450 Wh/kg. Moreover, the following conditions can be satisfied: 200 Wh/kg≤gE5≤400 Wh/kg; or 250 Wh/kg≤gE5≤350 Wh/kg.

According to the present disclosure, the diameter of particles and the diameter distribution thereof can be obtained by measuring the amplitude corresponding to the time of the scattering light from the particles undergoing Brownian motion by dynamic light scattering. The diameter of particles can be calculated by the Stokes-Einstein equation, which is shown as follows:

$$D=kT/(3\pi\eta D_f),$$

wherein D is the diameter of the particles (its unit is m), k is Boltzmann constant (its unit is J/K), T is the absolute temperature (its unit is K), $\eta$ is the viscosity of the solvent (its unit is kg×m$^{-1}$×s$^{-1}$), and D$_f$ is the diffusion coefficient (its unit is m$^2$×s$^{-1}$).

According to the present disclosure, the diameter distribution is the distribution of diameter of the particles with different sizes in the samples to be tested. According to the ratio of the distribution of each diameter and the accumulated percentage based on volume, the function of cumulative particle size distribution can be obtained. For example: a diameter as the percentage of cumulative particle size distribution reaching 50% is D50, which represents that there are 50% particles in the sample to be tested having the diameter less than the diameter of D50. D10, D90 have the similar definitions.

According to the present disclosure, the diameter of the core can be measured from analyzing the diffraction peak {111} of the silicon crystal grain by the X-ray diffractometer according to the Scherrer equation:

$$L=(\kappa\times\lambda)/(\beta\cos(\theta/2)),$$

wherein L is the diameter of the silicon crystal grain (its unit is nm); $\kappa$ is the shape factor, which is about 0.9 but changes depending on the actual shape of the crystal grain; $\beta$ is the full width at half maximum of the diffraction peak {111} (its unit is radian); and $\theta$ is the position of the diffraction peak {111}.

According to the present disclosure, the anode piece can be manufactured by the methods of coating on single layer or double layers, vacuum coating or composite structures.

According to the present disclosure, the membrane thickness of the shell can be measured by scanning electron microscope (SEM), transmission electron microscope (TEM) or scanning transmission electron microscope (STEM) with energy-dispersive X-ray spectroscope (EDS). The membrane thickness of the shell is obtained by taking a picture of the core-shell structure by the microscope, selecting the side on which the structure of the core and the structure of the shell can be clearly identified, and determining the membrane thickness of the shell according to the scale. If it is difficult to measure the membrane thickness of the shell by SEM or TEM, the membrane thickness of the shell can be calculated by measuring the weight loss of the core-shell structure as the temperature increasing and the particle size of the core by thermogravimetric analysis (TGA). It is assumed that the core-shell structure is a spherical structure, and the diameter as the percentage of cumulative particle size distribution reaching 50% is taken for calculation. The weight of the shell in the single core-shell structure can be obtained based on the density of silicon being 2.33 (g×cm$^{-3}$). The weight of the single shell can be obtained from the ratio of the total weight loss of the shell and the remaining total weight of the core, and the membrane thickness of the shell can be calculated by the following equation:

$$Ws=(4/3)\times\pi\times\{[Ths+(cD50/2)]^3-(cD50/2)^3\}\times\sigma,$$

wherein Ws is the weight of the shell in the single core-shell structure (its unit is g), Ths is the membrane thickness of the shell (its unit is nm), cD50 is the diameter as the percentage of cumulative particle size distribution reaching 50% (it unit is nm), and $\sigma$ is the density of the shell (its unit is $g \times nm^{-3}$).

According to the present disclosure, the roughness is an arithmetical mean height of the surface of the surface characteristic parameter Sa ($\mu$m) according to ISO 251781. The region for measuring the roughness is set for an area being at least larger than 10000 $\mu m^2$. The average height of the surface is the arithmetical mean of the height of each point $Z(x,y)$ in the region. Sa is the average value of the absolute values of the difference between each point $Z(x,y)$ in the region and the average height of the surface according to the following equation:

$$Sa = \frac{1}{A} \int \int_A |Z(x, y) - h| \, dxdy,$$

wherein A is the area of the region ($\mu m^2$), and h is the average height of the surface ($\mu$m).

According to the present disclosure, the conductivity is measured by the electrochemical impedance spectroscopy (EIS) method. An alternating current of 1 Hz to 100 Hz and the amplitude of 50 mV is applied to the polymer or the electrolyte. The resistance value is measured, and the conductivity is calculated by the following equation:

$$Ci=(1/R) \times (L/A),$$

wherein Ci ($S \times cm^{-1}$) is the conductivity, R ($\Omega$) is the resistance value, L (cm) is the distance between two electrodes, and A ($cm^2$) is the sectional area of the sample to be tested and the electrodes, wherein (L/A) can be defined as the conductivity parameter ($cm^{-1}$).

According to the present disclosure, the electrochemical stability is measured by linear sweep voltammetry (LSV). The scanning speed is 0.1 V/s and it is repeatedly tested under the condition of the $Li/Li^+$ relative voltage between $-5$ V to 5 V, and the results of the relationship changes between the current and potential corresponding thereto can be obtained.

According to the present disclosure, the battery assembly can include a battery case, a spring, a spacer, a lid, a tab, a cap.

According to the present disclosure, the battery can be a primary cell or a secondary cell. The electrochemical carrier of the primary cell or the secondary cell can be at least one of a button type carrier, a winding type carrier or a stacking type carrier. It can be applied to the portable electronic products, such as digital cameras, mobile phones, notebook computers, console handles and other devices which need to be light and thin, or applied to the power storage industries with large-scale, such as light electric cars and electric cars.

According to the present disclosure, all the related arrangements of the diameter of the core, the composition of the core-shell structure and the membrane thickness of the shell are further for manufacturing the electrode pieces based on the corresponding ratios, which can undergo the discharging and charging tests of the battery. In the present disclosure, only the ratios and the discharging and charging tests of the battery of part of the electrode pieces with the related arrangements are shown.

According to the present disclosure, silicon is represented by Si, silicon oxide is represented by $SiO_2$, 3-trimethoxysilylpropyl 2-methylprop-2-enoate is represented by MPS, methyl 2-methylprop-2-enoate is represented by MMA, methyl prop-2-enoate is represented by MA, 2-ethylhexyl prop-2-enoate is represented by 2EHA, and prop-2-enoic acid is represented by AA. If there is no corresponding result for a certain cell or the calculation result is meaningless, it is represented by N/A.

According to the above description of the present disclosure, the following specific embodiments are provided for further explanation.

1st Embodiment

The anode of the 1st embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and methyl prop-2-enoate.

According to the anode of the 1st embodiment, when a diameter of the core is cD50, and a membrane thickness of the shell is Ths, the following conditions are satisfied: cD50=80 nm; Ths=2 nm; and 10×(Ths/cD50)=0.25.

The detailed data of the anode of the 1st embodiment are shown in Table 1 below.

2nd Embodiment

The anode of the 2nd embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and methyl prop-2-enoate.

According to the anode of the 2nd embodiment, the anode further includes a carbon material. When a total weight of the core-shell structure is Wk, and a total weight of the carbon material is Wt, the following conditions are satisfied:

$$Wk=0.7 \text{ g}; \ Wt=0.7 \text{ g}; \ and(Wk/Wt)=1.00.$$

According to the anode of the 2nd embodiment, the anode further includes a coating layer. When a thickness of the coating layer is ThA, the following condition is satisfied: ThA=100 $\mu$m.

The detailed data of the anode of the 2nd embodiment are shown in Table 1 below. The definitions of these parameters shown in Table 1 are the same as those stated in the 1st embodiment with corresponding values for the 2nd embodiment, so an explanation in this regard will not be provided here again.

3rd Embodiment

The anode of the 3rd embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and methyl prop-2-enoate.

The detailed data of the anode of the 3rd embodiment are shown in Table 1 below. The definitions of these parameters shown in Table 1 are the same as those stated in the 1st embodiment and the 2nd embodiment with corresponding values for the 3rd embodiment, so an explanation in this regard will not be provided here again.

4th Embodiment

The anode of the 4th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and methyl prop-2-enoate.

According to the anode of the 4th embodiment, the anode further includes a coating layer. When a surface roughness of the coating layer of the anode is Ra, the following condition is satisfied: Ra=6.29 μm.

The detailed data of the anode of the 4th embodiment are shown in Table 1 below. The definitions of these parameters shown in Table 1 are the same as those stated in the 1st embodiment and the 2nd embodiment with corresponding values for the 4th embodiment, so an explanation in this regard will not be provided here again.

5th Embodiment

The anode of the 5th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and methyl prop-2-enoate.

The detailed data of the anode of the 5th embodiment are shown in Table 1 below. The definitions of these parameters shown in Table 1 are the same as those stated in the 1st embodiment, the 2nd embodiment and the 4th embodiment with corresponding values for the 5th embodiment, so an explanation in this regard will not be provided here again.

TABLE 1

| | | 1st Embodiment | 2nd Embodiment | 3rd Embodiment | 4th Embodiment | 5th Embodiment |
|---|---|---|---|---|---|---|
| Diameter of Core (nm) | cD50 | 80 | 80 | 80 | 80 | 80 |
| Composition of Core-Shell Structure | Shell Core | $Si + SiO_2$ | $Si + SiO_2$ | $Si + SiO_2$ | $Si + SiO_2$ | $Si + SiO_2$ |
| | Monomer of First Structure | MPS | MPS | MPS | MPS | MPS |
| | Monomer of Second Structure | MMA + MA | MMA + MA | MMA + MA | MMA + MA | MMA + MA |
| Membrane Thickness of Shell (nm) | Ths | 2 | 2.7 | 4.6 | 4.7 | 5.6 |
| $10 \times (Ths/cD50)$ | | 0.25 | 0.34 | 0.58 | 0.59 | 0.70 |
| Total Weight of Core-Shell Structure (g) | Wk | — | 0.7 | 0.7 | 0.7 | — |
| Total Weight of Carbon Material (g) | Wt | — | 0.7 | 0.7 | 0 | — |
| (Wk/Wt) | | — | 1.00 | 1.00 | N/A | — |
| Roughness (μm) | Ra | — | — | — | 6.29 | — |
| Thickness of Coating Layer of Anode (μm) | ThA | — | 100 | 100 | 100 | — |

6th Embodiment

The anode of the 6th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methyl prop-2-enoate, and a precursor of the second structure is methyl 2-methyl prop-2-enoate and methyl prop-2-enoate.

The detailed data of the anode of the 6th embodiment are shown in Table 2 below. The definitions of these parameters shown in Table 2 are the same as those stated in the 1st embodiment, the 2nd embodiment and the 4th embodiment with corresponding values for the 6th embodiment, so an explanation in this regard will not be provided here again.

7th Embodiment

The anode of the 7th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and methyl prop-2-enoate.

The detailed data of the anode of the 7th embodiment are shown in Table 2 below. The definitions of these parameters shown in Table 2 are the same as those stated in the 1st embodiment, the 2nd embodiment and the 4th embodiment with corresponding values for the 7th embodiment, so an explanation in this regard will not be provided here again.

8th Embodiment

The anode of the 8th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and methyl prop-2-enoate.

The detailed data of the anode of the 8th embodiment are shown in Table 2 below. The definitions of these parameters shown in Table 2 are the same as those stated in the 1st embodiment, the 2nd embodiment and the 4th embodiment with corresponding values for the 8th embodiment, so an explanation in this regard will not be provided here again.

9th Embodiment

The anode of the 9th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and methyl prop-2-enoate.

The detailed data of the anode of the 9th embodiment are shown in Table 2 below. The definitions of these parameters shown in Table 2 are the same as those stated in the 1st embodiment, the 2nd embodiment and the 4th embodiment with corresponding values for the 9th embodiment, so an explanation in this regard will not be provided here again.

10th Embodiment

The anode of the 10th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methyl prop-2-enoate, and a precursor of the second structure is methyl 2-methyl prop-2-enoate and methyl prop-2-enoate.

The detailed data of the anode of the 10th embodiment are shown in Table 2 below. The definitions of these parameters shown in Table 2 are the same as those stated in the 1st embodiment, the 2nd embodiment and the 4th embodiment with corresponding values for the 10th embodiment, so an explanation in this regard will not be provided here again.

TABLE 2

| | | 6th Embodiment | 7th Embodiment | 8th Embodiment | 9th Embodiment | 10th Embodiment |
|---|---|---|---|---|---|---|
| Diameter of Core (nm) | cD50 | 80 | 80 | 2000 | 2000 | 2000 |
| Composition of Core-Shell Structure | Shell | Core Monomer of First Structure | $Si + SiO_2$ MPS | $Si + SiO_2$ MPS | $Si + SiO_2$ MPS | $Si + SiO_2$ MPS | $Si + SiO_2$ MPS |
| | | Monomer of Second Structure | MMA + MA | MMA + MA | MMA + MA | MMA + MA | MMA + MA |
| Membrane Thickness of Shell (nm) | Ths | 7.9 | 8.03 | 4 | 10 | 10 |
| 10×(Ths/cD50) | | 0.99 | 1.00 | 0.02 | 0.05 | 0.05 |
| Total Weight of Core-Shell Structure (g) | Wk | 0.7 | — | — | 0.042 | 0.07 |
| Total Weight of Carbon Material (g) | Wt | 0.7 | — | — | 1.358 | 1.33 |
| (Wk/Wt) | | 1.00 | — | — | 0.03 | 0.05 |
| Roughness (μm) | Ra | — | — | — | 2.68 | 2.69 |

TABLE 2-continued

|  |  | 6th Embodiment | 7th Embodiment | 8th Embodiment | 9th Embodiment | 10th Embodiment |
|---|---|---|---|---|---|---|
| Thickness of Coating Layer of Anode (μm) | ThA | 100 | — | — | 100 | 100 |

11th Embodiment

The anode of the 11th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and methyl prop-2-enoate.

The detailed data of the anode of the 11th embodiment are shown in Table 3 below. The definitions of these parameters shown in Table 3 are the same as those stated in the 1st embodiment, the 2nd embodiment and the 4th embodiment with corresponding values for the 11th embodiment, so an explanation in this regard will not be provided here again.

12th Embodiment

The anode of the 12th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and methyl prop-2-enoate.

The detailed data of the anode of the 12th embodiment are shown in Table 3 below. The definitions of these parameters shown in Table 3 are the same as those stated in the 1st embodiment, the 2nd embodiment and the 4th embodiment with corresponding values for the 12th embodiment, so an explanation in this regard will not be provided here again.

13th Embodiment

The anode of the 13th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and methyl prop-2-enoate.

The detailed data of the anode of the 13th embodiment are shown in Table 3 below. The definitions of these parameters shown in Table 3 are the same as those stated in the 1st embodiment, the 2nd embodiment and the 4th embodiment with corresponding values for the 13th embodiment, so an explanation in this regard will not be provided here again.

14th Embodiment

The anode of the 14th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and methyl prop-2-enoate.

The detailed data of the anode of the 14th embodiment are shown in Table 3 below. The definitions of these parameters shown in Table 3 are the same as those stated in the 1st embodiment, the 2nd embodiment and the 4th embodiment with corresponding values for the 14th embodiment, so an explanation in this regard will not be provided here again.

15th Embodiment

The anode of the 15th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and methyl prop-2-enoate.

The detailed data of the anode of the 15th embodiment are shown in Table 3 below. The definitions of these parameters shown in Table 3 are the same as those stated in the 1st embodiment, the 2nd embodiment and the 4th embodiment with corresponding values for the 15th embodiment, so an explanation in this regard will not be provided here again.

TABLE 3

|  |  |  | 11th Embodiment | 12th Embodiment | 13th Embodiment | 14th Embodiment | 15th Embodiment |
|---|---|---|---|---|---|---|---|
| Diameter of Core (nm) | cD50 |  | 2000 | 2000 | 2000 | 2000 | 2000 |
| Composition of Core-Shell Structure | Shell | Core Monomer of First Structure | Si + $SiO_2$ MPS | Si + $SiO_2$ MPS | Si + $SiO_2$ MPS | Si + $SiO_2$ MPS | Si + $SiO_2$ MPS |
|  |  | Monomer of Second Structure | MMA + MA | MMA + MA | MMA + MA | MMA + MA | MMA + MA |

TABLE 3-continued

| | | 11th Embodiment | 12th Embodiment | 13th Embodiment | 14th Embodiment | 15th Embodiment |
|---|---|---|---|---|---|---|
| Membrane Thickness of Shell (nm) | Ths | 10 | 16.6 | 18 | 18 | 18 |
| 10×(Ths/cD50) | | 0.05 | 0.08 | 0.09 | 0.09 | 0.09 |
| Total Weight of Core-Shell Structure (g) | Wk | 0.14 | — | 0.042 | 0.07 | 0.14 |
| Total Weight of Carbon Material (g) | Wt | 1.26 | — | 1.358 | 1.33 | 1.26 |
| (Wk/Wt) | | 0.11 | — | 0.03 | 0.05 | 0.11 |
| Roughness (µm) | Ra | 2.64 | — | 2.55 | 2.50 | 2.93 |
| Thickness of Coating Layer of Anode (µm) | ThA | 100 | — | 100 | 100 | 100 |

16th Embodiment

The anode of the 16th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methyl prop-2-enoate, and a precursor of the second structure is methyl 2-methylprop-2-enoate and methyl prop-2-enoate.

The detailed data of the anode of the 16th embodiment are shown in Table 4 below. The definitions of these parameters shown in Table 4 are the same as those stated in the 1st embodiment, the 2nd embodiment and the 4th embodiment with corresponding values for the 16th embodiment, so an explanation in this regard will not be provided here again.

17th Embodiment

The anode of the 17th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and methyl prop-2-enoate.

The detailed data of the anode of the 17th embodiment are shown in Table 4 below. The definitions of these parameters shown in Table 4 are the same as those stated in the 1st embodiment, the 2nd embodiment and the 4th embodiment with corresponding values for the 17th embodiment, so an explanation in this regard will not be provided here again.

18th Embodiment

The anode of the 18th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and methyl prop-2-enoate.

The detailed data of the anode of the 18th embodiment are shown in Table 4 below. The definitions of these parameters shown in Table 4 are the same as those stated in the 1st embodiment, the 2nd embodiment and the 4th embodiment with corresponding values for the 18th embodiment, so an explanation in this regard will not be provided here again.

19th Embodiment

The anode of the 19th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and methyl prop-2-enoate.

The detailed data of the anode of the 19th embodiment are shown in Table 4 below. The definitions of these parameters shown in Table 4 are the same as those stated in the 1st embodiment, the 2nd embodiment and the 4th embodiment with corresponding values for the 19th embodiment, so an explanation in this regard will not be provided here again.

20th Embodiment

The anode of the 20th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and methyl prop-2-enoate.

The detailed data of the anode of the 20th embodiment are shown in Table 4 below. The definitions of these parameters shown in Table 4 are the same as those stated in the 1st embodiment, the 2nd embodiment and the 4th embodiment with corresponding values for the 20th embodiment, so an explanation in this regard will not be provided here again.

TABLE 4

| | | 16th Embodiment | 17th Embodiment | 18th Embodiment | 19th Embodiment | 20th Embodiment |
|---|---|---|---|---|---|---|
| Diameter of Core (nm) | cD50 | 2000 | 2000 | 2000 | 2000 | 2000 |
| Composition of Core-Shell Structure | Shell Core Monomer of First Structure | Si + SiO$_2$ MPS | Si + SiO$_2$ MPS | Si + SiO$_2$ MPS | Si + SiO$_2$ MPS | Si + SiO$_2$ MPS |
| | Monomer of Second Structure | MMA + MA | MMA + MA | MMA + MA | MMA + MA | MMA + MA |
| Membrane Thickness of Shell (nm) | Ths | 22.7 | 28.8 | 33.43 | 39.98 | 49.94 |
| 10×(Ths/cD50) | | 0.11 | 0.14 | 0.17 | 0.20 | 0.25 |
| Total Weight of Core-Shell Structure (g) | Wk | — | — | — | — | — |
| Total Weight of Carbon Material (g) | Wt | — | — | — | — | — |
| (Wk/Wt) | | — | — | — | — | — |
| Roughness (μm) | Ra | — | — | — | — | — |
| Thickness of Coating Layer of Anode (μm) | ThA | — | — | — | — | — |

21st Embodiment

The anode of the 21st embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and methyl prop-2-enoate.

The detailed data of the anode of the 21st embodiment are shown in Table 5 below. The definitions of these parameters shown in Table 5 are the same as those stated in the 1st embodiment, the 2nd embodiment and the 4th embodiment with corresponding values for the 21st embodiment, so an explanation in this regard will not be provided here again.

22nd Embodiment

The anode of the 22nd embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and methyl prop-2-enoate.

The detailed data of the anode of the 22nd embodiment are shown in Table 5 below. The definitions of these parameters shown in Table 5 are the same as those stated in the 1st embodiment, the 2nd embodiment and the 4th embodiment with corresponding values for the 22nd embodiment, so an explanation in this regard will not be provided here again.

23rd Embodiment

The anode of the 23rd embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and 2-ethylhexyl prop-2-enoate.

The detailed data of the anode of the 23rd embodiment are shown in Table 5 below. The definitions of these parameters shown in Table 5 are the same as those stated in the 1st embodiment, the 2nd embodiment and the 4th embodiment with corresponding values for the 23rd embodiment, so an explanation in this regard will not be provided here again.

24th Embodiment

The anode of the 24th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and 2-ethylhexyl prop-2-enoate.

The detailed data of the anode of the 24th embodiment are shown in Table 5 below. The definitions of these parameters shown in Table 5 are the same as those stated in the 1st embodiment, the 2nd embodiment and the 4th embodiment with corresponding values for the 24th embodiment, so an explanation in this regard will not be provided here again.

25th Embodiment

The anode of the 25th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methyl prop-2-enoate and 2-ethylhexyl prop-2-enoate.

The detailed data of the anode of the 25th embodiment are shown in Table 5 below. The definitions of these parameters shown in Table 5 are the same as those stated in the 1st embodiment, the 2nd embodiment and the 4th embodiment with corresponding values for the 25th embodiment, so an explanation in this regard will not be provided here again.

The detailed data of the anode of the 27th embodiment are shown in Table 6 below. The definitions of these parameters shown in Table 6 are the same as those stated in the 1st embodiment, the 2nd embodiment and the 4th embodiment with corresponding values for the 27th embodiment, so an explanation in this regard will not be provided here again.

28th Embodiment

The anode of the 28th embodiment includes a battery material. The battery material is a core-shell structure, and

TABLE 5

|  |  | 21st Embodiment | 22nd Embodiment | 23rd Embodiment | 24th Embodiment | 25th Embodiment |
|---|---|---|---|---|---|---|
| Diameter of Core (nm) | cD50 | 2000 | 2000 | 80 | 80 | 80 |
| Composition of Core-Shell Structure | Core | $Si + SiO_2$ | $Si + SiO_2$ | $Si + SiO_2$ | $Si + SiO_2$ | $Si + SiO_2$ |
|  | Shell Monomer of First Structure | MPS | MPS | MPS | MPS | MPS |
|  | Monomer of Second Structure | MMA + MA | MMA + MA | MMA + 2EHA | MMA + 2EHA | MMA + 2EHA |
| Membrane Thickness of Shell (nm) | Ths | 58.15 | 145.94 | 2.5 | 4.6 | 5 |
| $10 \times (Ths/cD50)$ |  | 0.29 | 0.73 | 0.31 | 0.58 | 0.63 |
| Total Weight of Core-Shell Structure (g) | Wk | — | — | — | — | 0.14 |
| Total Weight of Carbon Material (g) | Wt | — | — | — | — | 1.26 |
| (Wk/Wt) |  | — | — | — | — | 0.11 |
| Roughness (μm) | Ra | — | — | — | — | 2.73 |
| Thickness of Coating Layer of Anode (μm) | ThA | — | — | — | — | 100 |

The anode of the 26th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and 2-ethylhexyl prop-2-enoate.

The detailed data of the anode of the 26th embodiment are shown in Table 6 below. The definitions of these parameters shown in Table 6 are the same as those stated in the 1st embodiment, the 2nd embodiment and the 4th embodiment with corresponding values for the 26th embodiment, so an explanation in this regard will not be provided here again.

27th Embodiment

The anode of the 27th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and 2-ethylhexyl prop-2-enoate.

the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and 2-ethylhexyl prop-2-enoate.

The detailed data of the anode of the 28th embodiment are shown in Table 6 below. The definitions of these parameters shown in Table 6 are the same as those stated in the 1st embodiment, the 2nd embodiment and the 4th embodiment with corresponding values for the 28th embodiment, so an explanation in this regard will not be provided here again.

29th Embodiment

The anode of the 29th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is prop-2-enoic acid and 2-ethylhexyl prop-2-enoate.

The detailed data of the anode of the 29th embodiment are shown in Table 6 below. The definitions of these parameters shown in Table 6 are the same as those stated in the 1st embodiment, the 2nd embodiment and the 4th embodiment with corresponding values for the 29th embodiment, so an explanation in this regard will not be provided here again.

30th Embodiment

The anode of the 30th embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is prop-2-enoic acid.

The detailed data of the anode of the 30th embodiment are shown in Table 6 below. The definitions of these parameters shown in Table 6 are the same as those stated in the 1st embodiment, the 2nd embodiment and the 4th embodiment with corresponding values for the 30th embodiment, so an explanation in this regard will not be provided here again.

TABLE 6

| | | 26th Embodiment | 27th Embodiment | 28th Embodiment | 29th Embodiment | 30th Embodiment |
|---|---|---|---|---|---|---|
| Diameter of Core (nm) | cD50 | 80 | 80 | 2000 | 80 | 80 |
| Composition of Core-Shell Structure | Core of Shell Structure | $Si + SiO_2$ Monomer | $Si + SiO_2$ MPS | $Si + SiO_2$ MPS | $Si + SiO_2$ MPS | $Si + SiO_2$ MPS |
| | Monomer of First Structure | | | | | |
| | Monomer of Second Structure | MMA + 2EHA | MMA + 2EHA | MMA + 2EHA | AA + 2EHA | AA |
| Membrane Thickness of Shell (nm) | Ths | 5.6 | 11 | 4 | 1.8 | 1.8 |
| 10×(Ths/cD50) | | 0.70 | 1.38 | 0.02 | 0.23 | 0.23 |
| Total Weight of Core-Shell Structure (g) | Wk | — | — | — | — | 0.14 |
| Total Weight of Carbon Material (g) | Wt | — | — | — | — | 1.26 |
| (Wk/Wt) | | — | — | — | — | 0.11 |
| Roughness (μm) | Ra | — | — | — | — | 2.95 |
| Thickness of Coating Layer of Anode (μm) | ThA | — | — | — | — | 100 |

31st Embodiment

The anode of the 31st embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is prop-2-enoic acid.

The detailed data of the anode of the 31st embodiment are shown in Table 7 below. The definitions of these parameters shown in Table 7 are the same as those stated in the 1st embodiment, the 2nd embodiment and the 4th embodiment with corresponding values for the 31st embodiment, so an explanation in this regard will not be provided here again.

32nd Embodiment

The anode of the 32nd embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is prop-2-enoic acid.

The detailed data of the anode of the 32nd embodiment are shown in Table 7 below. The definitions of these parameters shown in Table 7 are the same as those stated in the 1st embodiment, the 2nd embodiment and the 4th embodiment with corresponding values for the 32nd embodiment, so an explanation in this regard will not be provided here again.

TABLE 7

| | | 31st Embodiment | 32nd Embodiment |
|---|---|---|---|
| Diameter of Core (nm) | cD50 | 80 | 80 |
| Composition of Core-Shell Structure | Core | Si + SiO$_2$ | Si + SiO$_2$ |
| | Shell Monomer of First Structure | MPS | MPS |
| | Monomer of Second Structure | AA | AA |
| Membrane Thickness of Shell (nm) | Ths | 2.4 | 3.2 |
| 10×(Ths/cD50) | | 0.30 | 0.40 |
| Total Weight of Core-Shell Structure (g) | Wk | — | — |
| Total Weight of Carbon Material (g) | Wt | — | — |
| (Wk/Wt) | | — | — |
| Roughness (μm) | Ra | — | — |
| Thickness of Coating Layer of Anode (μm) | ThA | — | — |

1st Comparative Embodiment

The anode of the 1 st comparative embodiment includes a battery material. The battery material includes a core. A composition of the core includes silicon and silicon oxide.

According to the anode of the 1st comparative embodiment, when a diameter of the core is cD50, the following condition is satisfied: cD50=80 nm.

According to the anode of the 1st comparative embodiment, the anode further includes a carbon material. A total weight of the core is 0.7 g, a total weight of the carbon material is 0.7 g, and a ratio between the total weight of the core and the total weight of the carbon material is 1.00.

According to the anode of the 1st comparative embodiment, when a diameter of the carbon material at 10% of diameter cumulative distribution is gD10, a diameter of the carbon material at 50% of diameter cumulative distribution is gD50, and a diameter of the carbon material at 90% of diameter cumulative distribution is gD90, the following conditions are satisfied: gD10=7.4 μm; gD50=14.6 μm; gD90=26.4 μm; and (gD90-gD10)/gD50=1.31.

According to the anode of the 1st comparative embodiment, the anode further includes a coating layer. When a thickness of the coating layer is ThA, the following condition is satisfied: ThA=100 μm.

The detailed data of the anode of the 1 st comparative embodiment are shown in Table 8 below.

2nd Comparative Embodiment

The anode of the 2nd comparative embodiment includes a battery material. The battery material includes a core. A composition of the core includes silicon and silicon oxide.

The detailed data of the anode of the 2nd comparative embodiment are shown in Table 8 below. The definitions of these parameters shown in Table 8 are the same as those stated in the 1st comparative embodiment with corresponding values for the 2nd comparative embodiment, so an explanation in this regard will not be provided here again.

3rd Comparative Embodiment

The anode of the 3rd comparative embodiment includes a battery material. The battery material includes a core. A composition of the core includes silicon and silicon oxide.

The detailed data of the anode of the 3rd comparative embodiment are shown in Table 8 below. The definitions of these parameters shown in Table 8 are the same as those stated in the 1st comparative embodiment with corresponding values for the 3rd comparative embodiment, so an explanation in this regard will not be provided here again.

4th Comparative Embodiment

The anode of the 4th comparative embodiment includes a battery material. The battery material includes a core. A composition of the core includes silicon and silicon oxide.

The detailed data of the anode of the 4th comparative embodiment are shown in Table 8 below. The definitions of these parameters shown in Table 8 are the same as those stated in the 1st comparative embodiment with corresponding values for the 4th comparative embodiment, so an explanation in this regard will not be provided here again.

5th Comparative Embodiment

The anode of the 5th comparative embodiment includes a battery material. The battery material is a core-shell structure, and the core-shell structure includes a core and a shell. The shell surrounds the core. A composition of the core includes silicon and silicon oxide. The shell includes a polymer, the polymer is linear and includes a first structure and a second structure. A precursor of the first structure is 3-trimethoxysilylpropyl 2-methylprop-2-enoate, and a precursor of the second structure is methyl 2-methylprop-2-enoate and methyl prop-2-enoate.

According to the anode of the 5th comparative embodiment, when a diameter of the core is cD50, and a membrane thickness of the shell is Ths, the following conditions are satisfied: cD50=80 nm; Ths=4.7 nm; and 10×(Ths/cD50)= 0.59.

According to the anode of the 5th comparative embodiment, the anode further includes a coating layer. When a surface roughness of the coating layer of the anode is Ra, the following condition is satisfied: Ra=6.29 μm.

The detailed data of the anode of the 5th comparative embodiment are shown in Table 8 below. The definitions of these parameters shown in Table 8 are the same as those stated in the 1st comparative embodiment with corresponding values for the 5th comparative embodiment, so an explanation in this regard will not be provided here again.

TABLE 8

| | | 1st Comparative Embodiment | 2nd Comparative Embodiment | 3rd Comparative Embodiment | 4th Comparative Embodiment | 5th Comparative Embodiment |
|---|---|---|---|---|---|---|
| Diameter of Core (nm) | cD50 | 80 | 80 | 80 | 80 | 80 |
| Composition of Core-Shell Structure | Core Shell Monomer of First Structure | $Si + SiO_2$ N/A | $Si + SiO_2$ N/A | $Si + SiO_2$ N/A | $Si + SiO_2$ N/A | $Si + SiO_2$ MPS |
| | Monomer of Second Structure | N/A | N/A | N/A | N/A | MMA + MA |
| Membrane Thickness of Shell (nm) | Ths | N/A | N/A | N/A | N/A | 4.7 |
| $10 \times (Ths/cD50)$ | | N/A | N/A | N/A | N/A | 0.59 |
| Total Weight of Core or Core-Shell Structure (g) | | 0.7 | 0.042 | 0.07 | 0.14 | 0.7 |
| Total Weight of Carbon Material (g) | | 0.7 | 1.358 | 1.33 | 1.26 | 0 |
| Total Weight of Core or Core-Shell Structure (g)/ Total Weight of Carbon Material (g) | | 1.00 | 0.03 | 0.05 | 0.11 | N/A |
| Roughness (μm) | Ra | — | — | — | — | 6.29 |
| Thickness of Coating Layer of Anode (μm) | ThA | 100 | 100 | 100 | 100 | 100 |
| Cumulative Particle Size Distribution of Carbon Material (μm) | gD10 | 7.4 | — | — | — | — |
| | gD50 | 14.6 | — | — | — | — |
| | gD90 | 26.4 | — | — | — | — |
| (gD90 − gD10)/gD50 | | 1.31 | — | — | — | — |

33rd Embodiment

The battery of the 33rd embodiment includes an anode. The anode includes a battery material. The battery material is a core-shell structure, and the core-shell structure includes a core and a shell. The shell surrounds the core.

According to the battery of the 33rd embodiment, when a diameter of the core is cD50, and a membrane thickness of the shell is Ths, the following conditions are satisfied: cD50=80 nm; and Ths=1.8 nm.

According to the battery of the 33rd embodiment, the anode further includes a carbon material. When a total weight of the core-shell structure is Wk, and a total weight of the carbon material is Wt, the following condition is satisfied: (Wk/Wt)=0.05.

According to the battery of the 33rd embodiment, when a discharge volumetric capacity of a first cycle of the battery is vC1, a discharge volumetric capacity of a fifth cycle of the battery is vC5, a discharge volumetric capacity of a tenth cycle of the battery is vC10, and a maximum of discharge volumetric capacities from a first cycle of the battery to a tenth cycle of the battery is vCMax, the following conditions are satisfied: $vC1=56.0$ mAh/cm$^3$; $vC10/vC5=0.94$; and $vCMax=64.9$ mAh/cm$^3$.

According to the battery of the 33rd embodiment, when a total number of Coulombic efficiency greater than 85% in first ten cycles of the battery is nCE10, the following condition is satisfied: nCE10=9.

The detailed data of the battery of the 33rd embodiment are shown in Table 9 below.

34th Embodiment

The battery of the 34th embodiment includes an anode. The anode includes a battery material. The battery material is a core-shell structure, and the core-shell structure includes a core and a shell. The shell surrounds the core.

The detailed data of the battery of the 34th embodiment are shown in Table 9 below. The definitions of these parameters shown in Table 9 are the same as those stated in the 33rd embodiment with corresponding values for the 34th embodiment, so an explanation in this regard will not be provided here again.

35th Embodiment

The battery of the 35th embodiment includes an anode. The anode includes a battery material. The battery material is a core-shell structure, and the core-shell structure includes a core and a shell. The shell surrounds the core.

The detailed data of the battery of the 35th embodiment are shown in Table 9 below. The definitions of these parameters shown in Table 9 are the same as those stated in the 33rd embodiment with corresponding values for the 35th embodiment, so an explanation in this regard will not be provided here again.

36th Embodiment

The battery of the 36th embodiment includes an anode. The anode includes a battery material. The battery material is a core-shell structure, and the core-shell structure includes a core and a shell. The shell surrounds the core.

The detailed data of the battery of the 36th embodiment are shown in Table 9 below. The definitions of these parameters shown in Table 9 are the same as those stated in the 33rd embodiment with corresponding values for the 36th embodiment, so an explanation in this regard will not be provided here again.

37th Embodiment

The battery of the 37th embodiment includes an anode. The anode includes a battery material. The battery material is a core-shell structure, and the core-shell structure includes a core and a shell. The shell surrounds the core.

The detailed data of the battery of the 37th embodiment are shown in Table 9 below. The definitions of these parameters shown in Table 9 are the same as those stated in the 33rd embodiment with corresponding values for the 37th embodiment, so an explanation in this regard will not be provided here again.

6th Comparative Embodiment

The battery of the 6th comparative embodiment includes an anode. The anode includes a battery material. The battery material is a carbon material.

The detailed data of the battery of the 6th comparative embodiment are shown in Table 9 below. The definitions of these parameters shown in Table 9 are the same as those stated in the 33rd embodiment with corresponding values for the 6th comparative embodiment, so an explanation in this regard will not be provided here again.

TABLE 9

| | | | 33rd Embodiment | 34th Embodiment | 35th Embodiment | 36th Embodiment | 37th Embodiment | 6th Comparative Embodiment |
|---|---|---|---|---|---|---|---|---|
| Diameter of Core (nm) | | cD50 | 80 | 80 | 80 | 80 | 2000 | N/A |
| Membrane Thickness of Shell (nm) | | Ths | 1.8 | 1.8 | 5 | 5 | — | N/A |
| (Wk/Wt) | | | 0.05 | 0.11 | 0.05 | 0.11 | — | 0 |
| Disch | 1st Charge | | 53.3 | 47.0 | 50.7 | 53.4 | — | 41.6 |
| | Discharge | vC1 | 56.0 | 53.1 | 57.4 | 53.6 | — | 45.3 |
| | 2nd Charge | | 51.6 | — | 52.2 | — | — | 44.7 |
| | Discharge | vC2 | 53.4 | — | 58.8 | — | — | 45.3 |
| | 3rd Charge | | 55.0 | — | 52.2 | — | — | 44.8 |
| | Discharge | vC3 | 64.9 | — | 58.8 | — | — | 45.3 |
| | 4th Charge | | 55.6 | — | 52.2 | — | — | 44.8 |
| | Discharge | vC4 | 57.1 | — | 58.8 | — | — | 45.3 |
| | 5th Charge | | 53.7 | — | 50.7 | — | — | 44.8 |
| | Discharge | vC5 | 55.6 | — | 57.4 | — | — | 45.3 |
| | 6th Charge | | 48.5 | — | 50.7 | — | — | 45.0 |
| | Discharge | vC6 | 53.3 | — | 57.4 | — | — | 45.3 |
| | 7th Charge | | 53.0 | — | 50.7 | — | — | 44.8 |
| | Discharge | vC7 | 54.5 | — | 57.4 | — | — | 45.3 |
| | 8th Charge | | 52.7 | — | 50.7 | — | — | 45.0 |
| | Discharge | vC8 | 57.6 | — | 57.4 | — | — | 45.3 |
| | 9th Charge | | 51.3 | — | 52.1 | — | — | 44.0 |
| | Discharge | vC9 | 52.7 | — | 58.8 | — | — | 45.3 |
| | 10th Charge | | 51.3 | — | 52.2 | — | — | 43.9 |
| | Discharge | vC10 | 52.2 | — | 58.8 | — | — | 45.3 |
| vCMax (mAh/cm³) | | | 64.9 | 53.1 | 58.8 | 53.6 | — | 45.3 |
| vC10/vC5 | | | 0.94 | — | 1.02 | — | — | 1.00 |
| Coulombic Efficiency (100%) | 1st | | 95.1 | 88.5 | 88.3 | 99.7 | — | 91.7 |
| | 2nd | | 96.6 | — | 88.8 | — | — | 98.6 |
| | 3rd | | 84.7 | — | 88.8 | — | — | 98.9 |
| | 4th | | 97.3 | — | 88.8 | — | — | 98.9 |
| | 5th | | 96.7 | — | 88.3 | — | — | 98.9 |
| | 6th | | 91.1 | — | 88.3 | — | — | 99.1 |
| | 7th | | 97.2 | — | 88.3 | — | — | 98.9 |
| | 8th | | 91.5 | — | 88.3 | — | — | 99.1 |
| | 9th | | 97.4 | — | 88.6 | — | — | 97.1 |
| | 10th | | 98.2 | — | 88.8 | — | — | 96.8 |
| nCE10 | | | 9 | — | 10 | — | — | 10 |

Although the present disclosure as been described in considerable e tai with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A battery material, which is a core-shell structure, the core-shell structure comprising:

a core; and a shell, wherein the shell surrounds the core;

wherein a composition of the core is a silicon material;

wherein the shell comprises a polymer, the polymer is linear, the polymer comprises a first structure and a second structure, the first structure comprises a siloxane group, and the second structure comprises a carboxyl group or an ester group;

wherein the first structure is more adjacent to the core than the second structure;

wherein a diameter of the core is cD50, a membrane thickness of the shell is Ths, and the following condition is satisfied:

$$0 < 10 \times (Ths/cD50) \le 8.0.$$

2. The battery material of claim 1, wherein a precursor of the first structure is 3-trimethoxysilylpropyl 2-methylprop-2-enoate, and the composition of the core comprises silicon and silicon oxide.

3. The battery material of claim 1, wherein a precursor of the second structure is selected from a group consisting of methyl 2-methylprop-2-enoate, 2-ethylhexyl prop-2-enoate, methyl prop-2-enoate and prop-2-enoic acid.

4. The battery material of claim 3, wherein the precursor of the second structure is selected from at least two materials of the group consisting of methyl 2-methylprop-2-enoate, 2-ethylhexyl prop-2-enoate, methyl prop-2-enoate and prop-2-enoic acid.

5. The battery material of claim 1, wherein the diameter of the core is cD50, and the following condition is satisfied:

$$350 \text{ nm} < cD50 < 15000 \text{ nm}.$$

6. The battery material of claim 5, wherein the membrane thickness of the shell is Ths, and the following condition is satisfied:

$$10 \text{ nm} < Ths < 150 \text{ nm}.$$

7. The battery material of claim 1, wherein the diameter of the core is cD50, and the following condition is satisfied:

$$30 \text{ nm} < cD50 < 150 \text{ nm}.$$

8. The battery material of claim 7, wherein the membrane thickness of the shell is Ths, and the following condition is satisfied:

$$1 \text{ nm} < Ths < 50 \text{ nm}.$$

9. The battery material of claim 1, wherein the diameter of the core is cD50, the membrane thickness of the shell is Ths, and the following condition is satisfied:

$$0 < 10 \times (Ths/cD50) \le 6.0.$$

10. An anode, comprising:

the battery material of claim 1.

11. The anode of claim 10, further comprising:

a carbon material.

12. The anode of claim 11, wherein a total weight of the core-shell structure is Wk, a total weight of the carbon material is Wt, and the following condition is satisfied:

$$0.01 < (Wk/Wt) < 10.0.$$

13. The anode of claim 11, wherein a diameter of the carbon material at 10% of diameter cumulative distribution is gD10, a diameter of the carbon material at 50% of diameter cumulative distribution is gD50, a diameter of the carbon material at 90% of diameter cumulative distribution is gD90, and the following condition is satisfied:

$$0 < (gD90-gD10)/gD50 < 5.0.$$

14. The anode of claim 10, wherein the anode comprises a coating layer, a thickness of the coating layer is ThA, and the following condition is satisfied:

$$50 \text{ μm} < ThA < 350 \text{ μm}.$$

15. The anode of claim 14, wherein a surface roughness of the coating layer of the anode is Ra, and the following condition is satisfied:

$$1.0 \text{ μm} < Ra < 10.0 \text{ μm}.$$

16. A battery, comprising:

the anode of claim 10.

17. The battery of claim 16, wherein a discharge volumetric capacity of a first cycle of the battery is vC1, and the following condition is satisfied:

$$30 \text{ mAh/cm}^3 \le vC1 \le 200 \text{ mAh/cm}^3.$$

18. The battery of claim 16, wherein a maximum of discharge volumetric capacities from a first cycle of the battery to a tenth cycle of the battery is vCMax, and the following condition is satisfied:

$$30 \text{ mAh/cm}^3 \le vC \text{ Max} \le 200 \text{ mAh/cm}^3.$$

19. The battery of claim 16, wherein a discharge volumetric capacity of a fifth cycle of the battery is vC5, a discharge volumetric capacity of a tenth cycle of the battery is vC10, and the following condition is satisfied:

$$0.80 \le vC10/vC5.$$

20. The battery of claim 16, wherein a total number of Coulombic efficiency greater than 85% in first ten cycles of the battery is nCE10, and the following condition is satisfied:

$$7 \le nCE10.$$

21. A battery material, which is a core-shell structure, the core-shell structure comprising:

a core; and a shell, wherein the shell surrounds the core;

wherein a composition of the core is a silicon material;

wherein the shell comprises a polymer, the polymer is linear, the polymer comprises a first structure and a second structure, the first structure comprises a siloxane group, and the second structure comprises a carboxyl group or an ester group;

wherein the first structure is more adjacent to the core than the second structure;

wherein a diameter of the core is cD50, and the following condition is satisfied:

$$30 \text{ nm} < cD50.$$

22. The battery material of claim 21, wherein the diameter of the core is cD50, and the following condition is satisfied:

$$40 \text{ nm} < cD50 < 15000 \text{ nm}.$$

23. The battery material of claim 21, wherein the composition of the core comprises silicon and silicon oxide.

24. An anode, comprising:

the battery material of claim 21.

25. The anode of claim 24, further comprising:

a carbon material.

26. A battery, comprising:

the anode of claim 24.

27. The battery of claim 26, wherein a maximum of discharge volumetric capacities from a first cycle of the battery to a tenth cycle of the battery is vCMax, and the following condition is satisfied:

$$30 \text{ mAh/cm}^3 \le vC\text{ Max} \le 200 \text{ mAh/cm}^3.$$

28. The battery of claim 26, wherein a discharge volumetric capacity of a fifth cycle of the battery is vC5, a discharge volumetric capacity of a tenth cycle of the battery is vC10, and the following condition is satisfied:

$$0.80 \le vC10/vC5.$$

29. The battery of claim 26, wherein a total number of Coulombic efficiency greater than 85% in first ten cycles of the battery is nCE10, and the following condition is satisfied:

$$7 \le nCE10.$$

\* \* \* \* \*